United States Patent [19]
Choong

[11] 3,960,046
[45] June 1, 1976

[54] MUSIC TEACHING DEVICE

[76] Inventor: Alan Chong Seong Choong, Flat 14, 2 Grattan St., Hawthorn, Victoria, Australia

[22] Filed: Dec. 16, 1974

[21] Appl. No.: 532,844

[30] Foreign Application Priority Data
Dec. 18, 1973 Australia............................ 6049/73
Apr. 8, 1974 Australia............................ 7185/74

[52] U.S. Cl. ............................ 84/471 R; 235/78 R
[51] Int. Cl.² .......................................... G09B 15/02
[58] Field of Search ............................ 84/470–475, 84/477–478; 235/78

[56] References Cited
UNITED STATES PATENTS

| | | |
|---|---|---|
| 763,870 | 6/1904 | Finley .................................. 84/474 |
| 2,913,885 | 3/1940 | Riley ..................................... 84/471 |
| 3,070,371 | 12/1962 | Hearle ................................. 84/471 |
| 3,427,918 | 2/1969 | Amoruso .............................. 84/474 |
| 3,481,241 | 12/1969 | Gaillard ............................... 84/474 |
| 3,572,205 | 3/1971 | Scholfield ............................ 84/474 |
| 3,592,099 | 7/1971 | Gibby ................................... 84/471 |
| 3,841,192 | 10/1974 | Leonard ............................... 84/474 |

Primary Examiner—L. T. Hix
Assistant Examiner—Vit W. Miska

[57] ABSTRACT

A music teaching device in which the musical scale is marked on a circular disc co-operable with a second disc bearing musical information the two discs being relatively rotatable about their centers to relatively align the scale markings with the information on the second disc.

18 Claims, 7 Drawing Figures

MUSIC TEACHING DEVICE

BACKGROUND OF THE INVENTION i. Field of the Invention

This invention relates to a music teaching device.

ii. Description of the Prior Art

Most beginners in the field of music have difficulty in grasping the fundamental concepts behind the organization of musical scale structures. It is thought that as a result of this failure in understanding, the teaching of music is tedious and frustrating both for the pupil and the teacher. An object of the present invention is to provide a device which can visually represent important concepts in the arrangement of musical scale and chord structures that will be beneficial to beginners as well as to accomplished musicians.

BRIEF DESCRIPTION OF THE INVENTION

According to the present invention there is provided a music teaching device comprising:

a first plate member having indicia provided in concentric annular regions of the plate member, the indicia within a region being at selected ones of twelve equiangularly disposed locations representative of a musically related sequence of notes, the locations being spaced at 30° intervals with the 12th location spaced 30° from the first location, and a second plate member provided with indicia uniformly arranged about an annular region of the second plate and sequentially representing the twelve notes of an equally tempered chromatic scale, the first and second plate members being disposed relative to one another so that their respective annular regions are concentric, and the first and second plate members being mounted together for relative rotation about the centre of the annular regions.

The arrangement of the indicia in annular regions provides a visual representation of the continuous nature of musical scales. Since the annular regions on the first plate member are divided into twelve equal spaces which correspond to the 12 half-tones within an octave visual familiarisation with this member and its associated indicia enables a student to appreciate the basic tonal arrangements, the composition of chord structures, and to readily effect chord transpositions from one key to another. Because of the annular arrangement of the indicia, chord transpositions can be effected continuously from one scale to another even when the transposition involves the transposition of one or more notes to an adjacent octave which is in contrast to the operation of devices arranged on a linear basis whereas linear arrangements provide no real appreciation of the continuous nature of musical scales.

Preferably, the first and second plate members comprise flat circular plates.

The second plate member may be smaller in diameter than the first plate member and have its indicia disposed about the circumference thereof. A first annular region on the first plate member may then be disposed so that it lies adjacent to and radially outward from the indicia on the second plate member, with further annular regions of the first plate member lying radially more distant from the indicia on the second plate member.

The indicia within an annular region on the first plate member may be related to the notes that constitute a chord. The indicia in the outer annular region of the first plate member may comprise a sequential numeral designation of the ordered pattern of those notes of the equally tempered chromatic scale which comprise major scale. Normally, each annular region of the first plate member will be provided with a datum point, and rotational alignment therewith with a selected "key" indicium of the second plate member will be accompanied by radial alignement of the indicia on each annular region of the first plate member with certain other indicia on the second plate member, the key indicium and the certain other indicia being the notes of a chord. The annular regions of the first plate member may be provided with different patterns of indicia such that the indicia of each will indicate the notes of different chords. The annular regions may be labelled Major, Minor, Diminished and Augmented in accordance with usual musical designation and be provided with appropriate indicia patterns the notes comprising the chord.

The device may include a third plate member also provided with indicia arranged about an annular region thereof and sequentially representing the 12 notes of an equally tempered chromatic scale, the third plate member being disposed with its annular region concentric with those of said first and second plate members and mounted together with the first and second plate members for relative rotation about said centre.

Preferably, the second plate member has the selected indicia thereon marked sequentially by numerals to indicate note degrees of a Major scale. Thus, a first indicium would be marked with the number 1, a third with the number 2, a fifth with the number 3, a sixth with the number 4, an eighth with the number 5, a 10 10th with the number 6 and a 12 12th with the number 7. The third plate member may then be marked with the sequence of actual note designations for an equally tempered chromatic scale. The fourth plate member may be provided with indicia uniformly arranged about an annular region thereof, this being disposed with its annular region concentric with those of the other plate members and mounted for relative rotation about said centre. The indicia of the fourth plate member may bear the consecutive numerical sequence 1 to 12.

The device may also include two of said first plate members. These may be mounted in overlying relationship, one being transparent to enable the other to be viewed therethrough and to enable coincidence of indicia on the two first plate members to be observed.

BRIEF DESCRIPTION OF THE SEVERAL VIEWS OF THE ACCOMPANYING DRAWINGS

The invention is further described with reference to the accompanying drawing in which.

DETAILED DESCRIPTION

Figure 1:
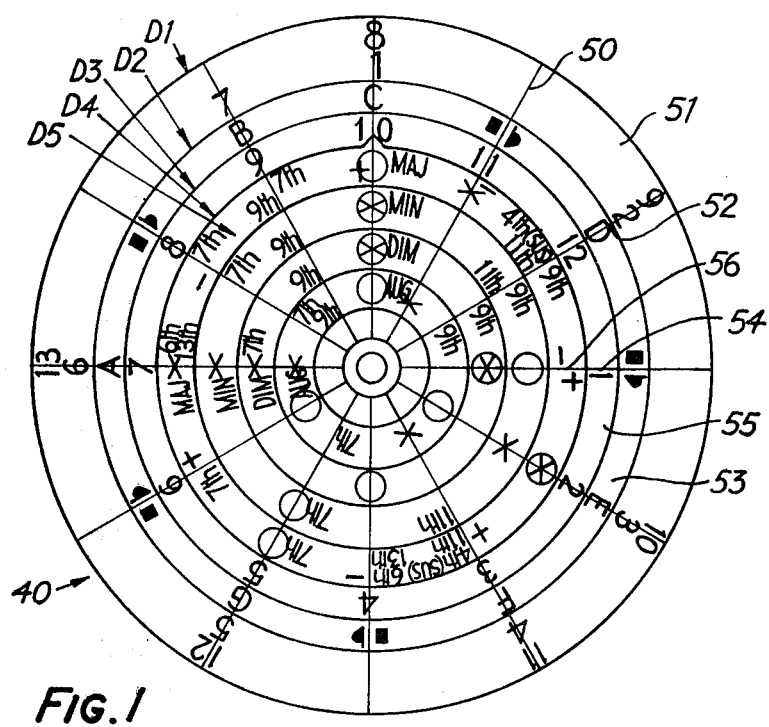
FIG. 1 is a plan view of a device constructed in accordance with the invention.
Figure 2:
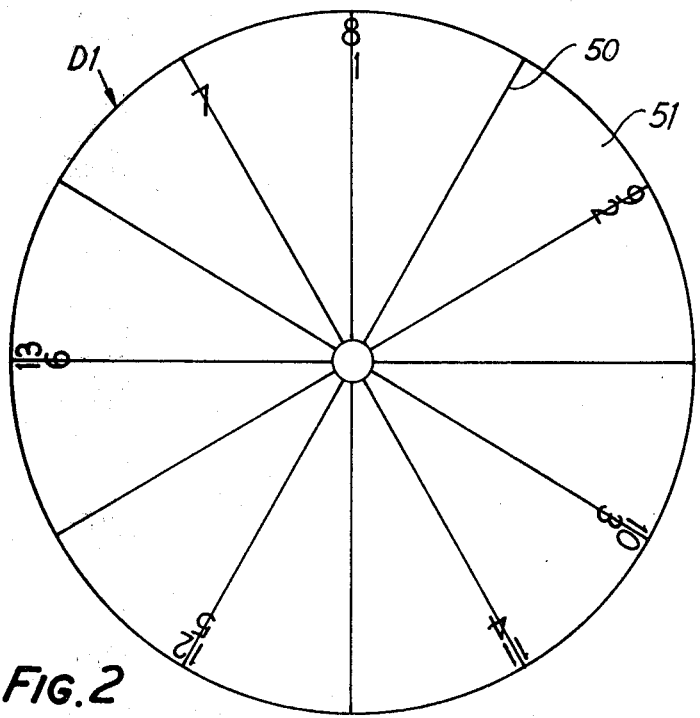
FIGS. 2 to 6 are plan views of five disc members included in the device of FIG. 1.
Figure 3:
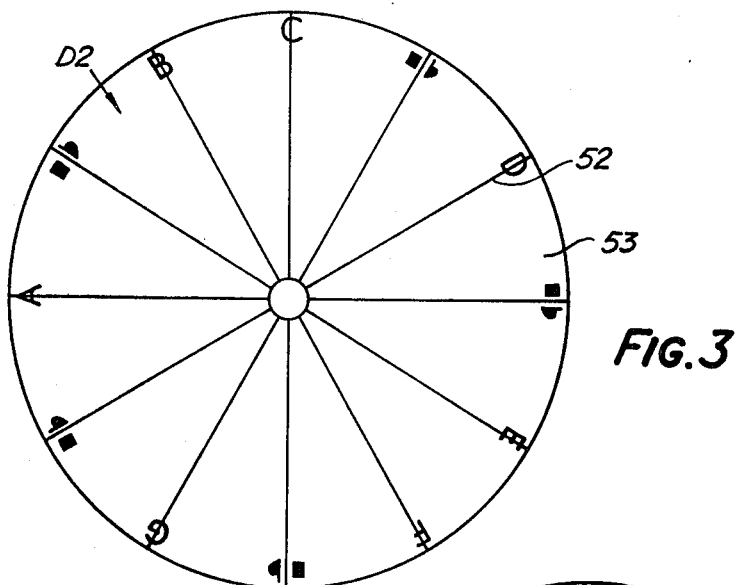
Figure 4:
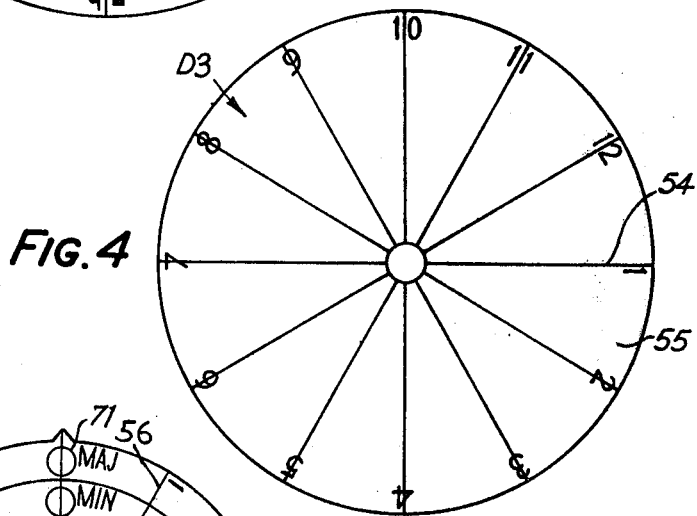

The device 40 of FIG. 1 includes an outer disc D1 having twelve equiangularly disposed line markings 50 on an outer annular region 51 thereof. The markings are thus spaced at 30° intervals with the 12th marking spaced 30° from the first marking. These are marked, in clockwise order, at a first marking with the numerals 1 and 8, at a third marking with the numerals 2 and 9, at a fifth with the numerals 3 and 10, at a sixth with the numerals 4 and 11, at an eighth with the numerals 5 and 12, at a 10 10th with the numerals 6 and 13 and at a 12th with the numeral 7. These markings designate a sequence of notes the numerals 1, 2, 3 . . . 13 referring to the positions of notes in a Major scale as extended over more than an octave.

A second disc D2, of smaller diameter than disc D1 overlies disc D1 concentrically. This is likewise marked with 12 equispaced radial lines 52 on an outer annular region 53 thereof. These are marked in clockwise sequence to indicate the seven notes of an octave and their alterations as these are normally designated in music, that is by the letters C, D, E, F, G, A, B with intermediate sharpened or flattened notes indicated by the alternative stylised markings ■ , ♭ shown. Thus, the 12 markings sequentially indicate the notes of an equally tempered chromatic scale as these notes would be designated in the key of C.

A third disc D3 concentrically overlies disc D2 and is of smaller diameter than disc D2. It also has twelve equiangularly spaced radial markings 54 on an outer region 55 thereof. These are sequentially designated, in clockwise order, by the numerals 1 to 12.

Figure 5:
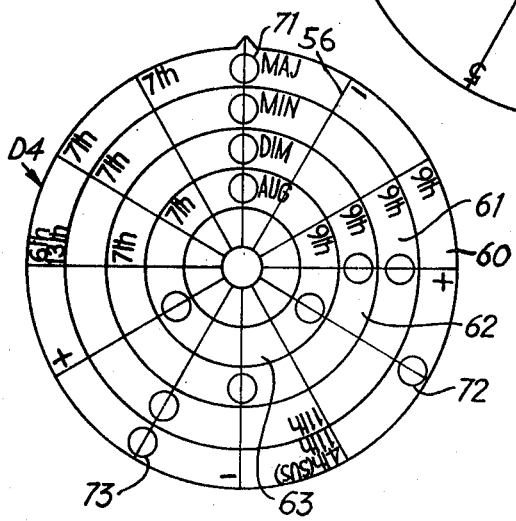
Figure 6:
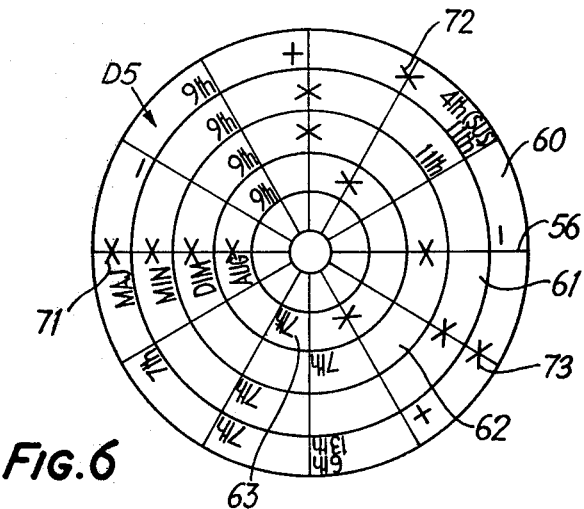

Two inner discs D4, D5 of equal diameter less than the diameter of disc D3 are also provided with 12 equiangularly spaced radial lines 56. Discs D4 and D5 are concentric with disc D1, D2 and D3 and are of like configuration as best seen from FIGS. 5 and 6; each having four concentric annular regions 60, 61, 62, 63 at which selected ones of the lines 56 are marked with circles, in the case of disc D4, or crosses, in the case of disc D5. Disc D5 overlies disc D4 but is transparent to enable disc D4 to be viewed therethrough.

The circle of cross markings within each region 60, 61, 62, 63 correspond to a sequence of notes within an octave, which sequence constitutes a particular type of chord. Thus, each region 60 has indicia markings 71, 72, 73 at first, fifth and eighth of the lines 56 and these correspond to note spacings making up a Major chord. The regions 61, 62 and 63 have indicia corresponding respectively to Minor, Diminished and Augmented chords. The regions 60-63 also include further markings at selected lines 56 indicating less important possible modifications of the chord note sequences. Thus, the indications sixth, seventh, ninth, 11th, 13th and fourth (sus.) + and − are positioned at ones of the lines 56 which correspond to particular notes to be included in chords designated, in accordance with usual musical convention by addition of these indications to the usual indications for Major, Minor, Diminished and Augmented chords.

Discs D1 to D5 are mounted for rotation about their centres by a pin 59 passing therethrough.

Disc D4 can be used by suitably positioning the line 56 upon which indicia 71 is located adjacent a selected note indicia on disc D2 and the notes comprising chords of the kinds indicated on regions 60 to 62 and built up from the selected note can be read off. Thus, in FIG. 1, where the disc D4 is aligned with the note C on disc D2 it can be immediately appreciated that the chord C Major comprises the notes C, E and G, the notes E and G being read off on disc D2 at positions adjacent markings 72, 73.

It will be appreciated that a similar operation to that described in relation to disc D4 can be undertaken with disc D5, since the discs D4 and D5 are identically marked. The provision of the two discs, however, permits chords built up from two different notes to be read off simultaneously. This provides an advantage in arranging in that it is possible, because of the overlying dispositions of the two discs D4 and D5, to immediately observe common notes between two chords which are set up by appropriate positioning of the discs. For example, if disc D5 is set up to read off the C Major chord, and disc D5 is set to read off the A Minor chord, the juxtaposition of the discs would be such as to make it immediately apparent that these chords had in common the notes C and E.

The disc D3 enables the number of semitones from and between selected notes of disc D2 to which it is adjacent, to be read off. Thus, if one wished to note the number of semitones between or from the note D to the note F the indication 12 on disc D3 would be positioned adjacent the note and the number of semitones, in this case three, would be read off accordingly as the number 3 on disc D3 then adjacent the note F on disc D2.

The outer disc D1 is marked in a manner which permits easy identification of the notes of chords built up on notes bearing particular relationships to the first note of a selected Major scale. Thus, when writing or arranging music it is frequently necessary to identify the notes of chords built up upon particular ones of the notes of the key scale within which the music is being written or arranged. In doing this, the composer or arranger may, for example, know from past experience that what is required for a particular musical effect is a chord which is built up upon a note which bears a particular relationship to the first note of the key scale from which the music is being built up. A composer or arranger could, knowing for example that the chord which he required was, say, the Major chord built up on the second note of the Major scale with which he is working, himself count up from the first note of the key scale to the note required, and set this note adjacent the indicia marking 71 on disc D4 whereby to enable reading off of the required chord notes. However, this operation can be simplified if the step of counting up from the base note to reach the base note of the chord required is avoided. It is this operation that the disc D1 avoids since if the indication 1 thereon be set adjacent the indicia on disc D2 representing the first note of the scale in which he is working, the note sequence of the Major scale can be read off easily from disc D1 onto disc D2. In FIG. 1, the indication 1 is adjacent the note C on disc D2 thus indicating that the Major scale or key in which the disc is set up is the key of C. If the composer requires a chord built up on the third note of C scale he can immediately determine this simply by turning the disc D4 or disc D5 so that the indicia 71 is adjacent the number 3 on disc D1 and then reading off the appropriate notes from disc D4 or disc D5, for the kind of chord he requires, back onto disc D2. It will be noted that there is no necessity, in doing this, for the user to make any determination of the actual identity of the first note of the chord he seeks, it being sufficient that the degree of the scale being worked with and upon which the chord is to be formed be known. This provides a very considerable advantage when working in key scales involving numerous flat and/or sharp notes.

The device provides a ready means of establishing the number and identity of sharp and flat notes in any selected Major scale, even those scales having "double sharp" or "double flat" notes. This is done by use of discs D1 and D2, it merely being necessary to bear in mind that note designation in any particular scale sequentially follows through the scale notes A, B, C etc. or alterations thereof, the scales always designating all altered notes therein only as sharp notes or only as flat notes.

Figure 7:
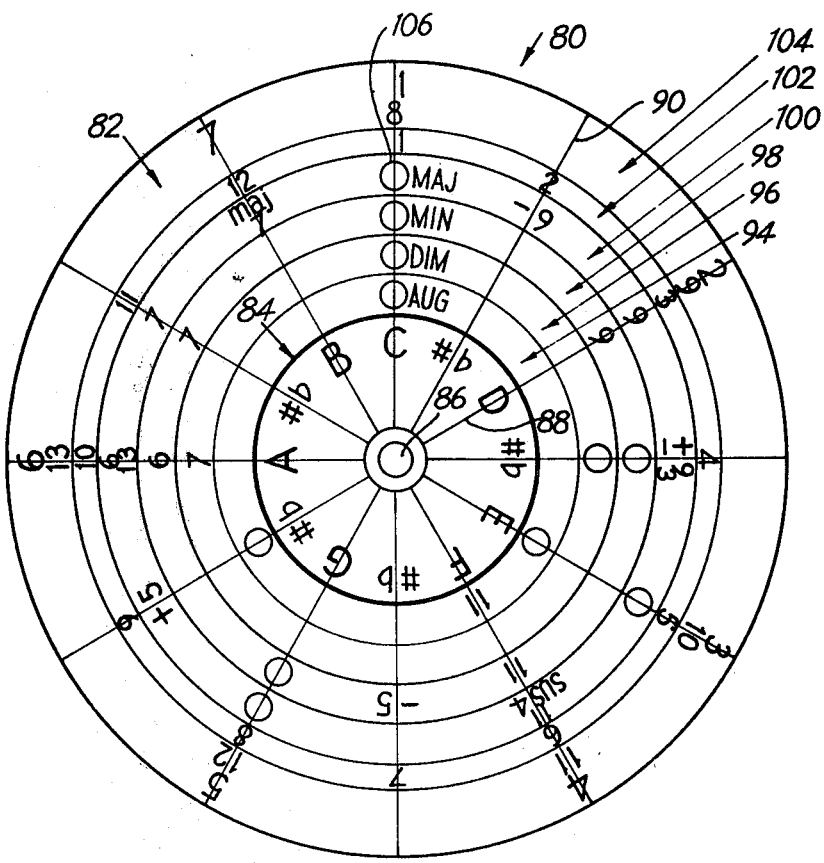
FIG. 7 is a plan view of a modified device constructed in accordance with the invention.

The device 80 of FIG. 7 is a simplified form of the device 40 of FIG. 1. It comprises two overlying discs 82, 84, disc 82 being of much larger diameter than disc 84 and the two discs being coupled together for relative rotational movement about the centres thereof by a pin 86 passing therethrough. Disc 84 has 12 equispaced radial lines 88 thereon with notes of an equally tempered scale designated at each line by the designations C, sharp b, D, sharp b, . . . .

Disc 82 also has 12 equiangularly spaced radial lines 90 thereon and six concentric annular regions 94, 96, 98, 100, 102, 104, region 94 surrounding the periphery of dosc 84 and region 104 being outermost and at the periphery of disc 82. Selected ones of the lines 90 in region 104 are designated by the numerals 1, 2, 3 . . . . to 13 these designations being at positions corresponding to the degress of a major scale extended over almost two octaves. Thus, the first seven numerals are positioned at respective first, third, fifth, sixth, eighth, 10th and 12th consecutive ones of the lines 90 whilst the numerals 8 to 13 are positioned respectively at the first, third, fifth, sixth, eighth and 10th lines 90. Region 104 simply designates lines 90 thereon by the reference numerals 1 to 12 this designation representing the notes of an equally tempered scale in sequence.

Regions 94 to 100 have lines 90 thereon marked with circles 106 such that the circles 106 in region 100 are positioned to designate the intervals of a major chord, those in region 98 to designate the intervals of a minor chord and those in regions 96 and 94 to designate the intervals of diminished and augmented chords respectively. These regions thus correspond to the regions 60 to 63 on discs D4 and D5 in the embodiment of FIG. 1 and the regions likewise bear various markings designating corresponding alterations to the chords. Device 80 is used in an analogous way to device 40 the discs 82, 84 performing the same functions as respective discs D4 and D2 in FIG. 1. Although the device 80 is thus not capable of being used for such a wide variety of operations as the device of FIG. 1, it nevertheless allows performance of all the functions which can be performed using only a disc D4 or D5 and disc D2 in FIG. 1.

The device of the invention has been found to be particularly useful, the division of each of the discs into twelve facilitating teaching by enabling the teacher to explain musical theory by referring to note positions as if these were positions of a clock face thus providing a readily understood analogy for students. The circular disposition is also, in itself, advantageous since it enables normally otherwise obscure matters of musical theory to be effectively illustrated. For example, in the device 40 of FIG. 1 it is a simple matter to see from the disposition of the markings on the inner annular region of disc D4 that the chord type normally designated in musical theory as an "Augmented" chord is made up of notes with equal intervals between consecutive notes, and it is easy to appreciate from inspection that the notes of any particular Augmented chord serve equally well to define two other Augmented chords.

The described arrangements have been described merely by way of explanation and many modifications may be made thereto without departing from the spirit and scope of the invention as defined in the appended claims.

I claim:
1. A music teaching device comprising:
a first plate member having at least one separate indicium at each of 12 regions, which regions are spaced substantially at a common radius from a common center and are positioned at locations corresponding to 12 equiangular divisions spaced 30° apart about the entire periphery of a circle defined about said center;
indicia at first, third, fifth, sixth, eighth, 10th and 12th ones of the regions, counted in one direction about said center, including numerals indicating respective degrees of a major musical scale;
a second plate member being provided having at least one separate indicium at each of 12 regions defined thereon, these regions being spaced substantially at a common radius from a common center and positioned at locations corresponding to 12 equiangular divisions spaced 30° apart about the entire periphery of a circle defined about the said center of the second plate member;
indicia on said second plate member at first, third, fifth, sixth, eighth, tenth and 12th regions, counted in the same direction as said one direction about said center of said second member, said indicia on said second plate member including alphabet letters respectively representing the notes of a C major scale beginning with the letter C; and
pivot means securing said two plate members together allowing relative rotational movement between the members about a common axis passing through their respective centers.

2. A music teaching device as claimed in claim 1, including a third plate member having at least one separate indicium at each of 12 regions, which regions are spaced substantially at a common radius from a common center and are positioned at locations corresponding to 12 equiangular divisions spaced 30° apart about the entire periphery of a circle defined about the center of the third plate member, and indicia on the third plate member including identifying marks at first, fifth, and eighth of the regions thereon, counted in said one direction, whereby to indicate the relative pitch intervals of notes in a major chord, said pivot means mounting said third plate member for relative rotation about said common axis, relative to each of said first and second plate members, and about the center of the third plate member.

3. A music teaching device as claimed in claim 1, wherein said plate members are in the form of circular discs of different diameters in overlying relationship.

4. A music teaching device as claimed in claim 1 wherein the second plate member is of lesser diameter than the first plate member, said regions on the second plate member being provided on an annular portion thereof adjacent the periphery of the second annular member, the indicia on said first plate member defining, between the periphery of the first and second plate members, a plurality of concentric annular portions of successively decreasing size, these including an outer annular portion on which the said regions of the first plate member are defined and one or more further annular portions, the indicia on the first plate member also defining at the or each further annular portion 12 further regions radially aligned with corresponding regions of the outer annular portion, and the indicia defining the or each further region including, at selected ones of the further regions within each further annular portion, identifying marks corresponding to pitch intervals of notes in a separate particular musical chord.

5. A music teaching device as claimed in claim 2 including a fourth plate member having at least one separate indicium at each of 12 regions, which regions are spaced substantially at a common radious from a common center and are positioned at locations corresponding to 12 equiangular divisions spaced 30° apart about the entire periphery of a circle defined about the center of the fourth plate member, the indicia at the 12 regions on the fourth plate member including numerals sequentially numbering these regions in said one direction to indicate the sequence of notes in an equally tempered chromatic scale.

6. A music teaching device as claimed in claim 3, wherein said plate members are in the form of circular discs of different diameters arranged in overlying disposition one over the other.

7. A music teaching device as claimed in claim 3, wherein the first plate member is of greater diameter than the second plate member, said regions on the first plate member being defined on an annular portion of the second plate member adjacent the periphery thereof and the said regions on the first plate member being provided on an annular portion of the first plate member adjacent the periphery thereof.

8. A music teaching device as claimed in claim 7, wherein the said regions on each plate member are marked by radial lines on the respective plate members.

9. A music teaching device as claimed in claim 6, wherein the first plate member is of largest diameter, the second directly overlies this and is of lesser diameter than the first plate member, the fourth plate member directly overlies the second plate member and is of lesser diameter than the second plate member and the third plate member directly overlies the fourth plate member and is of lesser diameter than the third plate member, the said regions of each plate member being defined on outer annular portions thereof adjacent to peripheries of the respective plate members.

10. A music teaching device as claimed in claim 9 wherein a fifth plate member is provided substantially identically marked and of substantially identical size and configuration to said third plate member and positioned for rotation about its center relative to the other plate members, said fifth plate member being formed of transparent material and overlying said third plate member.

11. A music teaching device as claimed in claim 9, wherein said indicia on said third plate member define on the third plate member a plurality of concentric annular portions, these including the said outer annular portion and one or more further annular portions, the indicia on the third plate member also defining at the or each further annular portion twelve further regions radially aligned with corresponding regions of the outer annular portion, and the indicia defining the or each further region including, at selected ones of the further regions within each further annular portion, identifying marks corresponding to pitch intervals of notes in a particular musical chord further to said major chord.

12. A music teaching device as claimed in claim 11, wherein the indicia on each said plate member includes 12 radial lines defining the said regions, the said identifying marks, alphabet letters and numerals, being positioned adjacent ones of these lines.

13. A music teaching device as claimed in claim 4, wherein the said regions and other regions on each plate member are marked by radial lines on the respective plate members.

14. A music teaching device comprising;
a first plate member having at least one separate indicium at each of 12 regions, which regions are spaced substantially at a common radius from a common center and are positioned at locations corresponding to 12 equiangular divisions spaced 30° apart about the entire periphery of a circle defined about said center; indicia at first, third, fifth, sixth, eighth, 10th and 12th ones of the regions, counted in one rotational direction about said center, including numerals indicating respective degrees of a major musical scale;
a second plate member having at least one separate indicium at each of 12 regions, which regions are spaced substantially at a common radius from a common center and are positioned at locations corresponding to 12 equiangular divisions spaced 30° apart about the entire periphery of a circle defined about the center of the second plate member including identifying marks at first, fifth and eighth of the regions thereon, counted in the same direction as said one direction, whereby to indicate the relative pitch intervals of notes in a major chord; and pivot means securing said two plates together allowing relative rotational movement between the members about a common axis passing through their respective centers.

15. A music teaching device as claimed in claim 14 including a third plate member having at least one separate indicium at each of 12 regions, which regions are spaced substantially at a common radius from a common center and are positioned at locations corresponding to 12 equiangular divisions spaced 30° apart about the entire periphery of a circle defined about the center of the third plate member, the indicia at the 12 regions on the fourth plate member including numerals sequentially numbering these regions to said one direction to indicate the sequence of notes in an equally tempered chromatic scale.

16. A music teaching device as claimed in claim 14 wherein said plate members are in the form of circular discs of different diameters in overlying relationship; said regions on the plate members being defined on annular portions thereof.

17. A music teaching device as claimed in claim 15 wherein said plate members are in the form of circular discs of different diameters arranged in overlying disposition; said regions on the plate members being defined on annular portions thereof.

18. A music teaching device as claimed in claim 16, wherein the said regions on each plate member are marked by radial lines on the respective plate members.

* * * * *